Patented Oct. 29, 1940

2,219,633

UNITED STATES PATENT OFFICE 2,219,633

PROCESS FOR THE TREATMENT OF SULPHIDE ORES

John Pande, Heggeli, near Oslo, Norway

No Drawing. Application May 10, 1937, Serial No. 141,861. In Norway September 26, 1936

1 Claim. (Cl. 23—102)

This invention relates to the treatment of ores or other materials containing lead, mercury, silver or other metals capable of forming chlorides or sulphates which are insoluble or only slightly soluble in water at ordinary temperatures, in the form of sulphides or free metals and has for its object a wet process for the extraction of the said metals from the material.

An important feature of the present invention consists in that the material containing the metals referred to in the form of sulphides or free metals is subjected to lixiviation with a dilute solution of a ferric salt such as ferric nitrate or ferric acetate, of which the negative radical is capable of forming with the metal to be extracted a salt which is readily soluble in water at ordinary temperature.

The method according to the invention is applicable as a means of effecting separation of metals from gangue matter as well as for the purpose of selectively extracting certain metal from a mixture of sulphides of several metals.

It has been found that when a mixture of metal sulphides with different heats of formation is treated with a ferric salt solution of the above character the sulphide having the lowest heat of formation will be decomposed and the metal thereof converted into a soluble salt before the sulphide having the higher heat of formation will be decomposed and dissolved. Thus when an ore containing sulphide of lead as well as sulphide of zinc is treated with a dilute and cold solution of ferric nitrate or ferric acetate, lead sulphide will be decomposed and dissolved while the zinc remains in the residuum. In this manner a satisfactory separation of lead from zinc can be brought about by simple and inexpensive means.

In the same way lead, mercury, or silver may be separated from sulphide material containing for example also $FeS_2$, $MnS$, $MoS_2$, $CdS$, etc.

When mixtures of several metal sulphides of comparatively low heat of formation are to be treated according to the invention the constituents of the lixiviation solution is in most instances chosen in such a way as to bring about dissolution of the sulphide or sulphides having the lowest heat of formation while the sulphide or sulphides having the higher heat of formation is retained in an undissolved condition. It is in several instances possible, however, to compose the lixiviation solution so as to dissolve the sulphides having the higher heat of formation, leaving the other sulphides in the residuum.

Example 1

The material to be treated was a mixture of ZnS and PbS in the form of a complex zinc-lead-ore containing 19.53 per cent Pb and 15.78 per cent Zn. This ore was finely ground and stirred with a cold, dilute, neutral, aqueous solution containing 260 gr. crystalline ferric nitrate to the liter (corresponding to 30 gr. Fe per liter). After a comparatively brief period of time the colour had been changed from brown to light green. This indicates that all ferric iron in the solution has been converted into ferrous iron. A quantitative chemical analysis showed at the same time that a quantity of lead corresponding to the following equation had entered into solution:

I. 
$$2Fe(NO_3)_3 + PbS = Pb(NO_3)_2 + 2Fe(NO_3)_2 + S$$

The liberated sulphur appeared to be of colloidal character as long as the solution contained ferric iron. But at the end of the reaction (colour-change to green) the sulphur precipitated in a readily filterable form at the same time as only traces of zinc were found to be present in the solution.

The solution was filtered and the filtrate was further treated to recover the lead contained therein.

Example 2

A dilute solution of ferric nitrate was circulated in counter current through several batches of complex ore of the type treated in Example 1 and thereupon through a filter and into an electrolytic cell with lead cathodes and graphite anodes. (The electrolysis may take place with or without diaphragm.)

The ferrous nitrate which was constantly in excess because the lye entering the cell was constantly reduced and the lead percentage maintained by constantly repeated contact with the ore, acted as a strong depolarizer. The lead was deposited in crystalline form. The reaction taking place may be illustrated by the equation:

II. Electric energy + 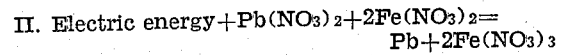
$$Pb(NO_3)_2 + 2Fe(NO_3)_2 = Pb + 2Fe(NO_3)_3$$

Necessary conditions of this process are the use of comparatively high current densities and an efficient circulation of the solution.

The combined reactions I and II may be illustrated as follows:

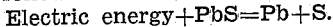
Electric energy + $PbS = Pb + S$.

The ore was subjected to lixiviation by the circulating solution until the percentage of lead had decreased to the desired minimum or to practically nil.

The residuum can further be treated to recover zinc therefrom.

By suitable choice of temperatures and of the metal salt concentration in the solution as well as by the use of a suitable negative radical (in the present example $NO_3$) it is possible to separate a metal with a comparatively lower heat of formation as metal sulphide, from other metal sulphides in any mixture of sulphides.

An important feature of the process is that supply of energy in the form of heat during the lixiviation is avoided. Another important feature consists in that the strength of the oxidizing agent is adjusted by maintaining a suitable concentration.

An important advantage of the process further consists in that it is possible by the choice of a suitable negative radical in the ferric salt of the lixiviating solution to obtain the metal to be recovered in the form of independent metal ions in solution and not in the form of complex negative ions. In the case of a dilute electrolyte this is of particularly great importance for maintaining the metal ion concentration as high as possible.

*Example 3*

The treatment was as according to Example 2 with the difference that a cold ferric acetate solution was employed instead of the ferric nitrate solution. In this instance lead entered into solution as lead acetate. Only traces of zinc were found in the solution. To avoid hydrolization of the ferric acetate it is of advantage to maintain the solution slightly acidic by acetic acid.

*Example 4*

A mercury ore containing besides mercury sulphide also metallic mercury was lixiviated with a ferric nitrate solution. By this treatment the sulphide as well as the metallic mercury was completely dissolved in the solution.

In the above examples the sulphide materials are treated with cold, neutral or weakly acid solutions. To operate with weakly acidic solutions may be desirable in order to prevent hydrolization, but the acidic reaction should then be brought about by quite small proportions of a weak acid.

The use of low temperatures and low percentages of the active salt is of importance to avoid dissolution of metal sulphides having comparatively high heats of formation (Examples 1, 2 and 3).

The metal salt employed is chosen that its negative radical forms watersoluble compounds with the metal or metals which it is desired to bring into solution.

*Example 5*

A Norwegian silver ore of the type containing free silver metal was treated as in Example 4. The silver was completely dissolved. The silver was thereupon deposited from the solution by electrolysis. The further treatment was as in the preceding examples.

I claim:

The method of extracting lead from ore containing PbS and ZnS comprising finely grinding the ore, contacting the ground ore at low temperature with a dilute, neutral water solution of ferric nitrate, to produce a cold water solution of $Pb(NO_3)_2$, removing the solution from contact with the ore when the solution becomes green, the resulting solution containing a large amount of lead nitrate but substantially no zinc.

JOHN PANDE.